United States Patent
Shaffer

(10) Patent No.: US 9,242,311 B2
(45) Date of Patent: Jan. 26, 2016

(54) USE OF SULFUR HEXAFLUORIDE GAS TO PREVENT LASER INDUCED AIR BREAKDOWN

(75) Inventor: Stephen P. Shaffer, West Hills, CA (US)

(73) Assignee: RAYTHEON COMPANY, Waltham, MA (US)

( * ) Notice: Subject to any disclaimer, the term of this patent is extended or adjusted under 35 U.S.C. 154(b) by 18 days.

(21) Appl. No.: 13/546,482

(22) Filed: Jul. 11, 2012

(65) Prior Publication Data

US 2014/0016192 A1 Jan. 16, 2014

(51) Int. Cl.
*G02B 23/24* (2006.01)
*B23K 26/12* (2014.01)
*G02B 1/06* (2006.01)
*G02B 5/20* (2006.01)
*B23K 26/14* (2014.01)
*H01S 3/00* (2006.01)

(52) U.S. Cl.
CPC .............. *B23K 26/123* (2013.01); *B23K 26/14* (2013.01); *G02B 1/06* (2013.01); *G02B 5/202* (2013.01); *H01S 3/005* (2013.01)

(58) Field of Classification Search
CPC ...... G02B 13/00; G02B 5/32; G02B 23/2446; G02B 5/208; G02B 13/143; H01S 5/026; H01S 3/2232; H01S 4/00; H01S 3/0675; H01S 3/08004; G03F 7/70641; G01C 15/105; B23K 9/00; B23K 26/0639; B23K 26/063; B23K 26/032; B01D 59/34; B01J 19/121; B01J 19/081; H01J 49/0036; H01J 49/025
See application file for complete search history.

(56) References Cited

U.S. PATENT DOCUMENTS

| | | | |
|---|---|---|---|
| 5,149,406 A | 9/1992 | Mullen et al. | |
| 6,275,288 B1 * | 8/2001 | Atkinson et al. | 356/246 |
| 6,707,603 B2 | 3/2004 | Ansley et al. | |
| 7,099,533 B1 * | 8/2006 | Chenard | 385/31 |
| 7,291,805 B2 | 11/2007 | Dane et al. | |
| 8,089,998 B2 | 1/2012 | Kopf | |
| 2005/0269499 A1 * | 12/2005 | Jones et al. | 250/269.1 |
| 2006/0293644 A1 * | 12/2006 | Umstadter | 606/10 |
| 2010/0245096 A1 * | 9/2010 | Jones et al. | 340/603 |
| 2011/0215717 A1 * | 9/2011 | Chen et al. | 313/542 |

OTHER PUBLICATIONS

H.E. Bennett, et al., "Laser Induced Damage in Optical Materials: 1981," Proceedings of a Symposium Sponsored by: National Bureau of Standards; Nov. 17-18, 1981; Issued Sep. 1983; 10 pages.
J. Dura, et al., "Wavelength Dependence of the Suppressed Ionization of Molecules in Strong Laser Fields," The Journal of Physical Chemistry; J. Phys, Chem. A 2012, 116, pp. 2662-2668.
R.A. Mullen, et al., "Quenching Optical Breakdown with an Applied Electric Field," Hughes Research Laboratories, California, USA; Jun. 1, 1990; vol. 15, No. 11; Optics Letters; pp. 601-603.

* cited by examiner

*Primary Examiner* — Stephone B Allen
*Assistant Examiner* — Jyotsna Dabbi
(74) *Attorney, Agent, or Firm* — Cantor Colburn LLP

(57) ABSTRACT

A method and apparatus for propagating a laser beam. The laser beam pulse is passed through a first lens which focuses the laser beam pulse at a focal point of the first lens. An electronegative gas at substantially atmospheric pressure is configured to surround the focal point in order to suppress an ionization effect by the laser beam pulse at the focal point.

18 Claims, 3 Drawing Sheets

USE OF SULFUR HEXAFLUORIDE GAS TO PREVENT LASER INDUCED AIR BREAKDOWN

BACKGROUND

The present disclosure relates generally to laser beam propagation and, more particularly, to methods and apparatus for preventing air ionization at regions of high laser beam intensity.

Laser beam pulses may be used in various industrial and military applications. For example, laser beam pulses can be reflected off of a selected target in order to determine a distance to the target. Devices for generating and recording such laser beam pulses generally include a lens system that changes the width of the beam. The laser beam pulse generally passes through a focal point of the lens system. As the laser beam pulse passes through the focal point, the energy density of the laser beam pulse can become high enough to ionize air at the focal point, which can impair the laser beam for its intended use. Therefore, there is a need for preventing air ionization resulting from high energy densities in laser beam pulse propagation devices.

SUMMARY

According to one embodiment, an apparatus for propagating a laser beam includes: a first lens for converging the laser beam to a focal point of the first lens; and an electronegative gas located at the focal point to suppress a photoionization effect at the focal point, wherein the pressure of the electronegative gas is substantially one atmosphere.

According to another embodiment, a method of propagating a laser beam includes: passing the laser beam through a first lens to focus the laser beam at a focal point of the first lens; and surrounding the focal point with an electronegative gas at a substantially atmospheric pressure to suppress an ionization effect by the laser beam at the focal point.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

A detailed description of one or more embodiments of the disclosed apparatus and method is presented herein by way of exemplification and not limitation with reference to the Figures.

Figure 1:
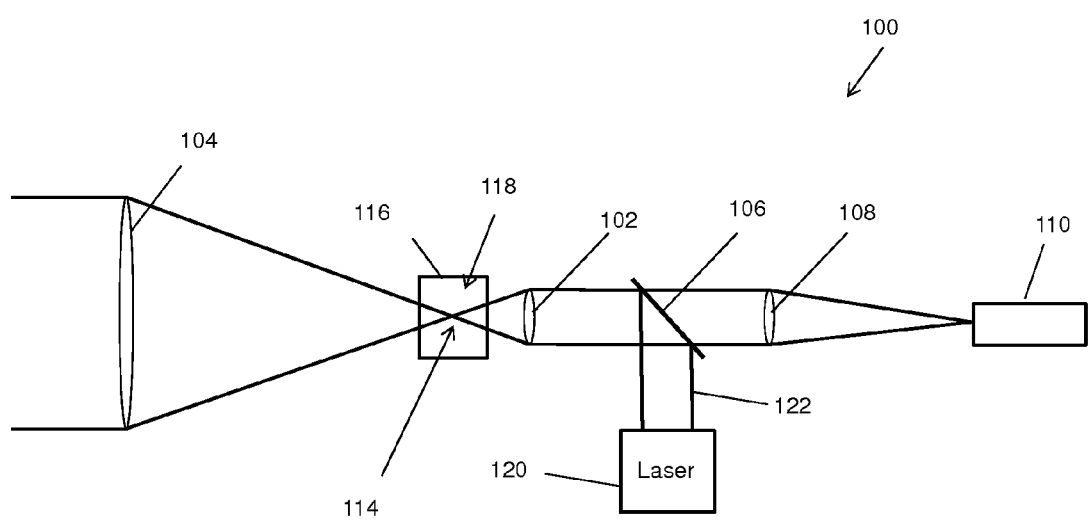
FIG. 1 illustrates as exemplary embodiment of an apparatus for propagating a laser beam pulse.

FIG. 1 shows an exemplary embodiment of a laser beam propagation device 100 of the present disclosure. The exemplary device 100 includes a laser 120, various optical elements, such as lenses 102, 104 and 108 and beam splitter 106, and an optical cell containing an electronegative gas to inhibit air ionization by the laser beam. The exemplary laser may be for example a Nd:YAG laser or any other suitable laser for providing a laser beam pulse. The laser 120 generates a laser beam pulse 122 that propagates towards beam splitter 106. The beam splitter 106 directs a portion of the laser beam 122 through a lens system that includes a first lens 102 and a second lens 104. A portion of the laser beam 122 may also be directed through lens 108 to be recorded at a recording device 110 for recording a parameter of the laser beam. The recording device 110 may obtain an image of the target or record a time-of-arrival of the laser beam pulse. In various embodiments, the recording device may be a camera, a monitor or television display for displaying an optical image, or an infrared imaging device such as a near infrared (NIR) imaging device, a shortwave infrared (SWIR) imaging device, a midwave infrared (MWIR) imaging device, a long wave infrared (LWIR) imaging device, or a far infrared (FIR) imaging device, among others.

The first lens 102 and the second lens 104 may be used to change a width of the laser beam pulse. The laser beam pulse 122 propagates through a focal point 114 of the first lens 102. As the laser beam pulse 122 converges at the focal point 114, the energy density per unit volume of the laser beam pulse 122 increases. When air is located at the focal point 114, the energy density of the laser beam pulse at the focal point 114 may exceed an ionization potential of the air. Air ionization impairs the laser beam pulse 122 for its intended use. Therefore, the device 100 includes an optical cell 116 centered at the focal point 114 that includes an electronegative gas 118 at approximately one atmosphere. The electronegative gas 118 in general has a higher ionization potential than air. Thus, the electronegative gas 118 is resistant to ionization by the laser beam pulse at the focal point 114.

In the exemplary laser beam propagation device 100, the optical cell 116 contains electronegative gas 118 that is held at substantially atmospheric pressure, i.e., one atmosphere. Exemplary electronegative gases may include, for example, sulfur hexafluoride. Sulfur hexafluoride is an inert, non-toxic, non-flammable gas that provides no light absorption within the range of visible light through the medium wavelength infrared. Sulfur hexafluoride also has a low leak rate due to its high molecular weight. Alternate electronegative gases that may be used include chlorfluorocarbons (i.e., Freon), such as such as Dichlorodifluoromethane (R-12), 1,2-Dichlorotetrafluoroethane (R-114), 1,1,1,2-Tetrafluoroethane (R-134a), Octafluorocyclobutane (R-C318), and Perfluorobutane (R-3-1-10), for example. Since the pressure of the electronegative gas is about 1 atmosphere, the optical cell may be made of thin material and/or flexible material without concern for withstanding pressure differentials across the walls of the optical cell. In contrast, prior art devices include gases held at high pressures or a vacuum, thereby requiring thick optical cell walls to withstand high pressure differentials as well as additional equipment such as pressure pumps and various electronic circuits. The exemplary optical cell 116 may further include a flexible wall or a bellows that may expand and/or contract in order to maintain the internal pressure in the optical cell at substantially one atmosphere. In an exemplary use of exemplary laser beam propagation device 100, the laser beam that exits the second lens 104 is reflected off of a selected target. The reflected beam returns via the second lens 104, passes through the optical cell 116 and focal point 114 and through first lens 102. A portion of the returning beam the passes through the beam splitter 106 and third lens 108 to be recorded at the recording device. The recording device may record a time-of-arrival of the original laser beam pulse and the reflected laser beam pulse and use time difference in the times-of-arrival to determine a distance to the selected target.

Figure 2:
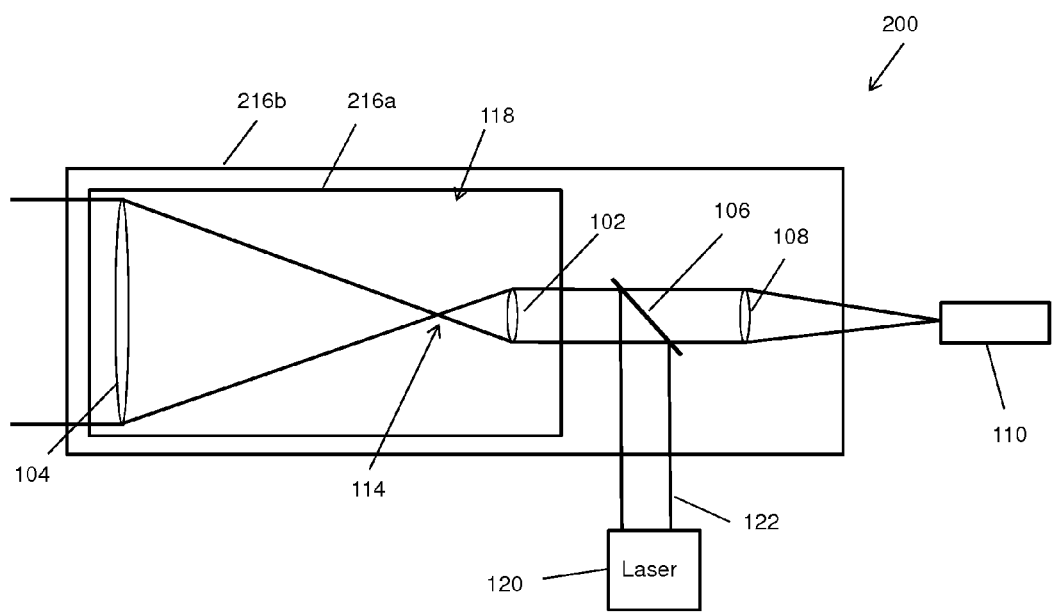
FIG. 2 illustrates an alternate embodiment of an apparatus for propagating a laser beam pulse.

FIG. 2 shows an alternate embodiment of a laser beam propagation device 200 of the present disclosure. The alternate device 200 includes an exemplary laser 120 that generates a laser beam pulse 122 that is directed towards beam splitter 106. The beam splitter 106 directs a portion the laser beam pulse through a lens system that includes a first lens 102 and a second lens 104. A portion of the beam may also be directed through lens 108 which focuses the portion of the beam at the exemplary recording device 110. The first lens 102 and second lens 104 are contained within exemplary optical cell 216a and may be held in place within the optical cell 216a using various holding devices (not shown). In another embodiment, alternate device 200 includes an optical cell 216b that contains first lens 102, second lens 104, beam splitter 106 and third lens 108. In additional alternate embodiments, any number of optical elements may be included in the optical cell, including any or the first lens 102, second lens 104, beam splitter 106, third lens 108, the laser 120 and recording device 110, among others.

Figure 3:
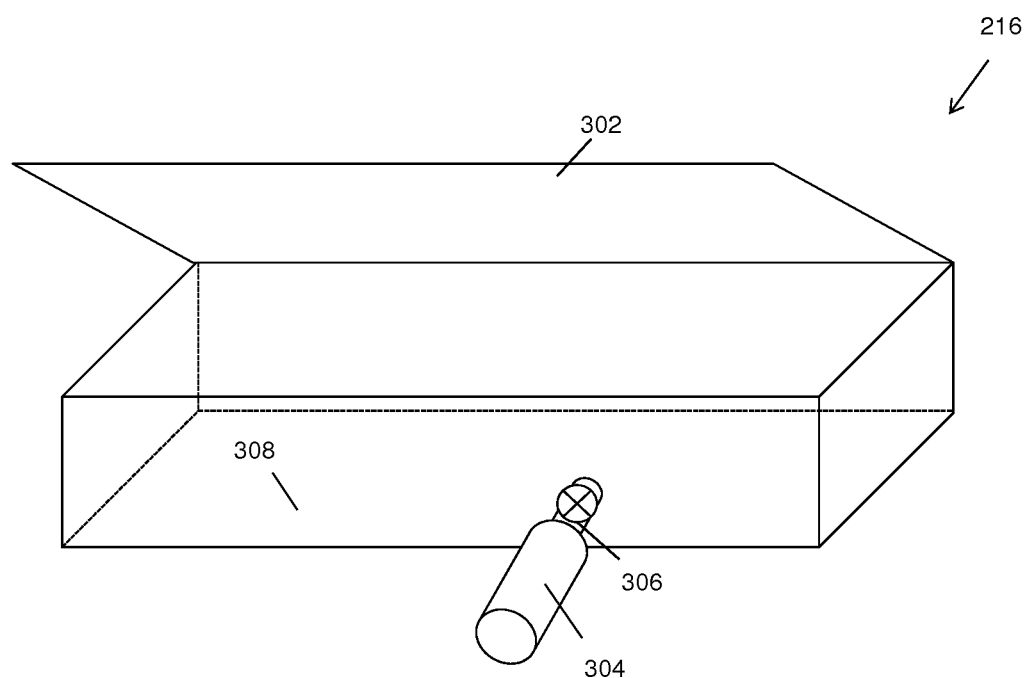
FIG. 3 shows an exemplary optical cell that may be used with the exemplary laser beam propagation device of FIG. 2.

FIG. 3 shows an exemplary optical cell 216 that may be used with the exemplary laser beam propagation device of FIG. 2. The exemplary optical cell 216 may include a cover 302 such as a hinged lid, sliding cover or other suitable element opening the optical cell and closing and sealing the optical cell. The exemplary optical cell 216a may be opened to allow replacing, cleaning and/or adjusting the first lens 102 and the second lens 104, for example. The optical cell 216 may then be closed and sealed to prevent gas transfer with the outside environment. Once sealed, electronegative gas may be introduced into the optical cell 216. The exemplary optical cell 216 may provide a port for a gas source 304 to provide the electronegative gas. The gas source 304 is coupled to the optical cell 216 and fills the optical cell 216 with the electronegative gas once the optical cell 216 is sealed. The electronegative gas may be used to prevent air ionization or to purge the optical cell, in various embodiments. The gas source may 304 may be a detachable source or container such as a gas bottle. In one embodiment, a flow element 306 may control the flow of the electronegative gas from the gas source into the optical cell. The exemplary optical cell 216 may further include a flexible wall or a bellows 308 that may expand and/or contract in order to control or to equalize a pressure of the gas within the optical cell as the gas is introduced, thereby maintaining a low pressure differential across the optical cell walls. Since a low pressure differential is across the optical cells walls, the optical cell walls can be thin, thereby providing little optical interference with the laser beam pulse at the cell wall. In addition, pressure pumps are not needed, thereby cutting down on the weight of the devices discussed herein. Optical cells enable construction of lightweight, portable devices that are easy to repair and/or replace.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list or string of at least two terms is intended to mean any term or combination of terms. The term "secure" relates to one component being coupled either directly to another component or indirectly to the another component via one or more intermediate components.

While the disclosure has been described with reference to a preferred embodiment or embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular embodiment disclosed as the best mode contemplated for carrying out this disclosure, but that the disclosure will include all embodiments falling within the scope of the appended claims.

What is claimed is:

1. An apparatus for locating a target, comprising:
   a laser for generating a laser beam;
   a first lens for directing the laser bean towards the target;
   an optical cell containing an electronegative gas at a focal point of the first lens to suppress a photoionization effect at the focal point, wherein the optical cell includes a flexible cell wall configured to expand and contract to maintain a pressure of the electronegative gas at the focal point is substantially one atmosphere; and
   a recording device configured to receive a reflection of the laser beam from the target in order to locate the target, wherein the reflection passes through the focal point of the first lens and through the first lens to reach the recording device.

2. The apparatus of claim 1, further comprising a second lens for providing a substantially parallel laser beam after the laser beam passes through the focal point, wherein the reflection passes through the second lens before passing through the focal point of the first lens and the first lens to reach the recording device.

3. The apparatus of claim 1, wherein the flexible cell wall is further configured to maintain an equilibrium between a pressure inside the optical cell with a pressure outside the optical cell.

4. The apparatus of claim 1, wherein the optical cell further comprises a cover configured for opening and sealing the optical cell.

5. The apparatus of claim 1, further comprising a detachable gas source coupled to the optical cell, the detachable gas source configured to supply the electronegative gas to the optical cell.

6. The apparatus of claim 1, wherein an optical element of the apparatus is disposed within the optical cell.

7. The apparatus of claim 1, wherein the electronegative gas includes at least one of: (i) sulfur hexafluoride; (ii) a chlorofluorocarbon; (iii) dichlorodifluoromethane (R-12); (iv) 1,2-dichlorotetrafluoroethane (R-114); (iv) 1,1,1,2-tetrafluoroethane (R-134a); (v) octafluorocyclobutane (R-C318); and (vi) perfluorobutane (R-3-1-10).

8. The apparatus of claim 1, wherein the recording device is configured to measure a distance to the target from a difference in times-of arrival of the generated laser beam and the reflected laser beam at the recording device.

9. A method of locating a target, comprising:
   generating a laser beam at a laser;
   passing the generated laser beam through a first lens to direct the laser beam toward the target, wherein the laser beam passing through the first lens converges at a focal point of the first lens and the focal point is contained in an optical cell;
   filling the optical cell with an electronegative gas at a substantially atmospheric pressure to surround the focal point with the electronegative gas that suppresses an ionization effect by the laser beam at the focal point, the optical cell including a flexible cell wall configured to expand and contract to maintain the pressure of the electronegative gas at the focal point at substantially atmospheric pressure; and
   receiving a reflection of the laser beam from the target at a recording device in order to locate the target, wherein the reflection passes through the focal point of the first lens and the first lens before being received at the recording device.

10. The method of claim 9, further comprising passing the laser beam through a second lens after the laser beam passes through the focal point and receiving the reflection at the second lens before the reflection passes through the focal point and the first lens.

11. The method of claim 9, wherein the flexible wall of the optical cell is further configured to maintain an equilibrium between a pressure inside the optical cell with a pressure outside the optical cell.

12. The method of claim 9, wherein the optical cell further includes a cover, the method further comprising opening optical cell and sealing the optical cell using the cover.

13. The method of claim 9, further comprising supplying the electronegative gas to the optical cell from a detachable gas source coupled to the optical cell.

14. The method of claim 9, wherein an optical element is located within the optical cell, further comprising passing the laser beam through a wall of the optical cell before passing the laser beam through the first lens.

15. The method of claim 9, wherein the electronegative gas includes at least one of: (i) sulfur hexafluoride; (ii) a chlorofluorocarbon; (iii) dichlorodifluoromethane (R-12); (iv) 1,2-dichlorotetrafluoroethane (R-114); (iv) 1,1,1,2-tetrafluoroethane (R-134a); (v) octafluorocyclobutane (R-C318); and (vi) perfluorobutane (R-3-1-10).

16. The method of claim 9, further comprising obtaining an image of the target from the reflection of the laser beam.

17. The method of claim 9, wherein an ionization potential of the electronegative gas is greater than an energy density of the laser beam at the focal point.

18. The method of claim 9, further comprising recording a time-of arrival of the generated laser beam and of the reflected laser beam at the recording device in order to measure a distance to the target from difference in the times-of-arrival.

* * * * *